(12) United States Patent
Sano et al.

(10) Patent No.: US 7,694,283 B2
(45) Date of Patent: Apr. 6, 2010

(54) METHOD AND APPARATUS FOR GENERATING SPECIFICATION DATA

(75) Inventors: Shin-ichi Sano, Kawasaki (JP); Hiroshi Sunaga, Shizuoka (JP); Koji Kobayashi, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 1442 days.

(21) Appl. No.: 11/065,711

(22) Filed: Feb. 25, 2005

(65) Prior Publication Data

US 2006/0107253 A1 May 18, 2006

(30) Foreign Application Priority Data

Nov. 10, 2004 (JP) .............................. 2004-326154

(51) Int. Cl.
*G06F 9/45* (2006.01)
(52) U.S. Cl. ..................................... 717/136
(58) Field of Classification Search .................. 717/136
See application file for complete search history.

(56) References Cited

U.S. PATENT DOCUMENTS 5,742,827 A * 4/1998 Ohkubo et al. .............. 717/143
6,951,010 B2 * 9/2005 Sasaki ....................... 717/123

OTHER PUBLICATIONS

Nimmer et al. "Automatic Generation of Program Specifications" 2002 ACM.*

* cited by examiner

*Primary Examiner*—Wei Y Zhen
*Assistant Examiner*—Junchun Wu
(74) *Attorney, Agent, or Firm*—Staas & Halsey LLP

(57) ABSTRACT

When a source program written in Java or the like and using methods of BigDecimal class, a priority conforming to a predetermined arithmetic rule is identified for an arithmetic operational method included in an arithmetic operation statement, and the arithmetic operational method and the identified priority are registered into a storage device. Then, in a case where it is judged based on data stored in the storage device that a plurality of arithmetic operational methods are included in an arithmetic operational statement, and an arithmetic operational method with low priority is defined as an instance of an arithmetic operational method with high priority, following processing is carried out to generate specification data, that is, the arithmetic operational method with low priority and an instance and argument of the arithmetic operational method with low priority are converted into a first subexpression using an arithmetic operational sign in accordance with a predetermined rule. Then, parentheses representing that the arithmetic operation are carried out with priority is added to the first subexpression. In addition, the arithmetic operational method with high priority and an argument of the arithmetic operational method with high priority are converted into a second subexpression using an arithmetic operational sign in accordance with the predetermined rule. Finally, the second subexpression is linked with the first subexpression.

9 Claims, 14 Drawing Sheets

FIG.4A

| ITEM NUMBER | LINE NUMBER | PROCESSING CONTENTS | CONDITION 1 | REMARKS |
|---|---|---|---|---|
| 1 | 4 | out_param.setNISSU(in_param.getNISSU()) | in_param.getRETURNCODE() == 0 | |
| | 3(CONDITION 1) | | | |

FIG.4B

| ITEM NUMBER | LINE NUMBER | PROCESSING CONTENTS | CONDITION 1 | REMARKS |
|---|---|---|---|---|
| 1 | 4 | out_param.NISSU=in_param.NISSU | in_param.RETURNCODE=0 | |
| | 3(CONDITION 1) | | | |

FIG.4C

| ITEM NUMBER | LINE NUMBER | PROCESSING CONTENTS | CONDITION 1 | REMARKS |
|---|---|---|---|---|
| 1 | 4 | OUTPUT AREA. NO. OF DAYS=INPUT AREA. NO. OF DAYS | INPUT AREA. RETURN VALUE= 0 | |
| | 3(CONDITION 1) | | | |

| VARIABLE NAME | MEANING |
|---|---|
| NISSU | NO. OF DAYS |
| RISOKU | INTEREST |
| GANKIN | PRINCIPAL |
| in_param | INPUT AREA |
| out_param | OUTPUT AREA |
| RETURNCODE | RETURN VALUE |
| : | : |

FIG.5

| VARIABLE NAME | VALUE | MEANING |
|---|---|---|
| HASUKUBUN | 1 | ROUND-DOWN |
| HASUKUBUN | 2 | ROUND-UP |
| : | : | : |
| | | |

FIG.6

| ARITHMETIC OPERATION METHOD | PRIORITY ORDER |
|---|---|
| pow | 1 |
| multiply | 2 |
| divide | 2 |
| add | 3 |
| subtract | 3 |
FIG.10
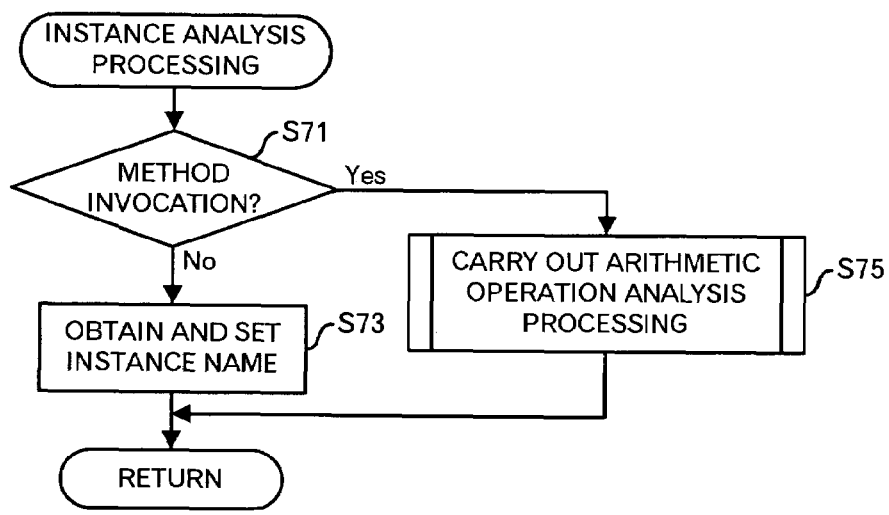
FIG.11
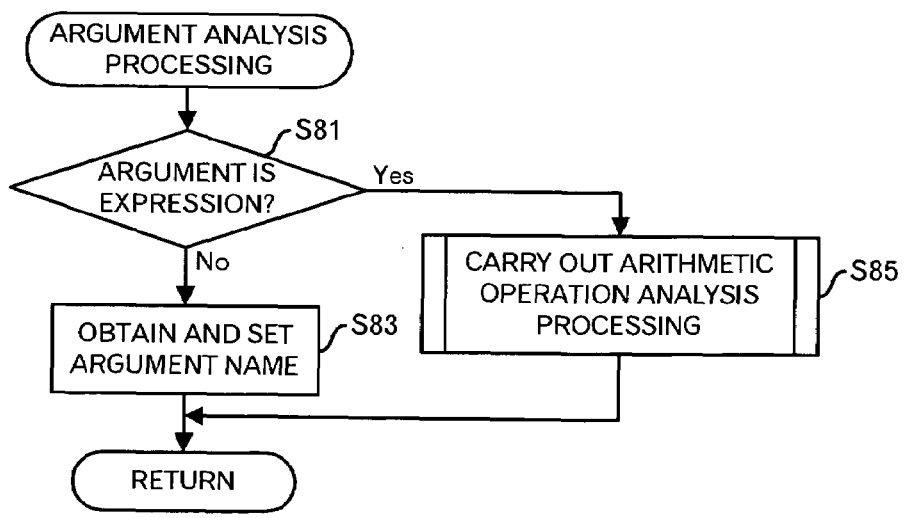
FIG.12

PROJECT NAME   "com.samples.a"
WORK SPACE     "L:¥apli¥ApworksV60L10_Win2000¥APW¥eclipse¥workspace¥20K"
FILE NAME      "M:¥PATENT¥sample.java"
METHOD NAME    sample#calc(denpyo INPUT AREA)

| ITEM NUMBER | LINE NUMBER | PROCESSING CONTENTS | CONDITION 3 | CONDITION 2 | CONDITION 1 | REMARKS |
|---|---|---|---|---|---|---|
| 1 | 4 3(CONDITION 1) | OUTPUT AREA. NO. OF DAYS = INPUT AREA. NO. OF DAYS | | | INPUT AREA. RETURN VALUE = 0 | |
| 2 | 7 6(CONDITION 2) 5(CONDITION 1) | OUTPUT AREA. PRINCIPAL = (OUTPUT AREA. PRINCIPAL + (1+200))/OUTPUT AREA. INTEREST UNIT * OUTPUT AREA. INTEREST UNIT | | INPUT AREA. RETURN VALUE = 1 | ELSE | |
| 3 | 9 8(CONDITION 3) 6(CONDITION 2) 5(CONDITION 1) | OUTPUT AREA. INTEREST = OUTPUT AREA. WK_PRINCIPAL * OUTPUT AREA. NO. OF DAYS * OUTPUT AREA. RATE / 365 * 10 ** 7 + 0.999 | OUTPUT AREA. FRACTION TREATMENT CATEGORY = "2" [[FRACTION TREATMENT CATEGORY. ROUND-UP]] | DITTO | DITTO | |
| 4 | 11 10(CONDITION 3) 6(CONDITION 2) 5(CONDITION 1) | OUTPUT AREA. WK_RISOKUA = OUTPUT AREA. WK_RPINCIPAL * OUTPUT AREA. NO. OF DAYS * OUTPUT AREA. RATE / 365 * 10 ** 7 | ELSE | DITTO | DITTO | |
| 5 | 14 13(CONDITION 2) 5(CONDITION 1) | OUTPUT AREA. ERROR NO. = 2 | | ELSE | DITTO | |
| 6 | 15 13(CONDITION 2) 5(CONDITION 1) | return | | DITTO | DITTO | |
| 7 | 18 | OUTPUT AREA. ERROR NO. = 0 | | | | |

FIG.18

| NO. | ORIGINAL DATA | DATA AFTER CONVERSION |
|---|---|---|
| 1 | INSTANCE NAME. get() | INSTANCE NAME |
| 2 | INSTANCE NAME. get(ARGUMENT 1,..., ARGUMENT n) | INSTANCE NAME(ARGUMENT 1,..., ARGUMENT n) |
| 3 | INSTANCE NAME. get ITEM NAME() | INSTANCE NAME. ITEM NAME |
| 4 | INSTANCE NAME. get ITEM NAME (ARGUMENT 1,..., ARGUMENT n) | INSTANCE NAME. ITEM NAME(ARGUMENT 1,..., ARGUMENT n) |
| 5 | get ITEM NAME() | ITEM NAME |
| 6 | get ITEM NAME(ARGUMENT 1,..., ARGUMENT n) | ITEM NAME(ARGUMENT 1,..., ARGUMENT n) |
| 7 | new BigDecimal("FIXED POINT CONSTANT") | FIXED POINT CONSTANT |

FIG.19

METHOD AND APPARATUS FOR GENERATING SPECIFICATION DATA

TECHNICAL FIELD OF THE INVENTION

The present invention relates to a technique for automatically generating a specification for a computer program.

BACKGROUND OF THE INVENTION

It is often more difficult to review programs written, for example, in Java (trademark of Sun Microsystems Inc.) than programs written in COBOL and etc. This might be because the reviewer's skill for Java is poor. However, this is mainly because mathematical expressions and syntaxes in COBOL are represented by method invocations, accordingly the programs in Java are difficult to read. For example, "WK_OUTOUBI>XHIAWYEIDT" in COBOL is expressed by "wk_x16.getWK_OUT OUBI( ).isGreaterThan(xhiarxhi.getXHIAWYEIDT( ))" in Java. Therefore, the readability is spoiled. Moreover, because many statements not related to reviews such as creation of objects and EJB (Enterprise Java Beans) initialization are set forth, these also impede improving the efficiency of reviewing.

Incidentally, automatic generation of specifications is disclosed, for example, in U.S. Pat. No. 5,742,827. That is, the syntax of the input program is analyzed, and the syntactic structure and data attributes are obtained. At the same time, the data flow is analyzed to obtain data flow information. In addition, the names of temporal variables within the program are detected, and data that has inclusion with those temporal variables is detected. Then, the data flows from reference locations to the temporal variables to setting locations of associated variables are traced by the inclusion of data, applications of the temporal variables such as holding of intermediate results of calculations, type conversion, division, composition, and so on are discerned, and those temporal variables which can be erased are deleted. Intermediate representations in which temporal variables have been erased are replaced by natural language descriptions to obtain a specification. However, problems in object-oriented languages as described above are not taken into consideration.

In the aforementioned art, any solution to a problem in which it is difficult to make a review of a program written in a program language such as Java is not described.

SUMMARY OF THE INVENTION

Accordingly, it is an object of the invention to provide a technique for automatically generating a specification for facilitating the review of a program written in a program language such as Java.

A method according to the present invention is a method for generating specification data from a source program (e.g., a source program described using a method of the Java's BigDecimal class) in which arithmetic operations are described in a method format, which comprises: identifying a priority conforming to a predetermined arithmetic rule for an arithmetic operational method included in an arithmetic operation statement that is included in a source program and defines an arithmetic operation, and registering the arithmetic operational method and the priority into a storage device; in a case where it is judged based on data stored in the storage device that a plurality of arithmetic operational methods are included in an arithmetic operational statement and an arithmetic operational method with low priority is defined as an instance of an arithmetic operational method with high priority, generating specification data and storing the specification data into a specification data storage by converting the arithmetic operational method with low priority and an instance and argument of the arithmetic operational method with low priority into a first subexpression using an arithmetic operational sign in accordance with a predetermined rule, adding parentheses representing that the arithmetic operation are carried out with priority, to the first subexpression, converting the arithmetic operational method with high priority and an argument of the arithmetic operational method with high priority into a second subexpression using an arithmetic operational sign in accordance with the predetermined rule, and linking the second subexpression with the first subexpression.

For example, in the Java's BigDecimal class used in mathematical expressions employed, for example, in the financial area, every arithmetic operation is represented by a method invocation. If this description is left intact, it is very difficult to make a review. Furthermore, if arithmetic operational statements described using methods of the BigDecimal class are simply converted, the order of priorities of operators (such as + and x) does not hold. Therefore, it is difficult to make a review as to whether correct processing is done. Accordingly, by carrying out the aforementioned processing, it becomes possible to present the correct contents of the arithmetic operational statements in a format that is easily understandable to the reviewer.

Furthermore, in the aforementioned registering, a data block holding the priority for the arithmetic operational method, data concerning an instance of the arithmetic operational method, and data concerning an argument of the arithmetic operational method may be generated and stored in the storage device. In some cases, the instance and argument may be described using arithmetic operational methods. In such cases, a data block may also be constructed for this instance and argument, and a reference may be made from a data block for the original arithmetic operational method. Moreover, a data block may be generated for later processing even if the argument and instance are not described using the arithmetic operational method.

Furthermore, the aforementioned generating may comprise: referring to a first dictionary storing a variable name so as to correspond to a word or phrase indicating the meaning of the variable name, and replacing variables contained in the first and second subexpressions with corresponding words or phrases. Consequently, the reviewer can read the specification with greater ease.

In addition, the present invention may further comprise: analyzing the source program to identify a processing statement and a condition associated with the processing statement, and storing them in the specification data storage in a corresponding manner. In this case, the aforementioned registering may be carried out for the processing statement and the condition that are arithmetic operational statements.

The aforementioned generating may comprise checking whether there are parentheses surrounding only one term in an arithmetic operational expression or there are parentheses surrounding only parenthesized characters; and removing the parentheses if there are parentheses surrounding only one term in a mathematical expression or there are parentheses surrounding only parenthesized characters. By carrying out such a processing, the arithmetic operational expression can be expressed more accurately.

Additionally, the aforementioned generating may comprise referring to a second dictionary storing words or phrases indicating the meanings of values of variables, extracting a word or phrase corresponding to a certain value of a certain variable, and storing the extracted word or phrase into the specification data storage (e.g. so as to correspond to the certain value of the certain variable). This is because, for example, in a case where a condition concerning a case in which a variable ABC becomes equal to 1 is stipulated, if one cannot understand the meaning of "1", there is a case where it is difficult to make a review.

Further, the aforementioned data concerning the argument may contain data indicating whether or not the argument is an expression. At that time, the aforementioned generating may comprise: referring to the data block to judge whether the argument of the arithmetic operational method is an expression or not; converting the expression into a third subexpression using arithmetic operational signs in accordance with the predetermined rule if it is judged that the argument is an expression, and adding parentheses to the third subexpression. This is because it may be necessary to take account of the priorities of the operators when the argument is also an expression.

It is possible to create a program for causing a computer to carry out the method for generating the specification data of the invention and a program to realize the wireless communication portable terminal, and the programs are stored in a storage medium or a storage device such as, for example, a flexible disk, a CD-ROM, a magneto-optical disk, a semiconductor memory, or a hard disk. Besides, the program may be distributed in digital signals through a network. Incidentally, the intermediate data in the processing is temporarily stored in a storage device such as a memory of a computer.

BRIEF DESCRIPTION OF THE DRAWINGS

FIGS. 4A-4C are diagrams of examples of the conversion;

FIG. 5 is a diagram showing one example of data stored in a word/word/phrase dictionary;

FIG. 6 is a diagram showing one example of data stored in a code dictionary;

FIG. 10 is a diagram illustrating the priority order of arithmetic operational methods;

FIG. 11 is a diagram showing a processing flow of an instance analyzing processing;

FIG. 12 is a diagram showing a processing flow of an argument analyzing processing;

FIG. 18 is a diagram showing one example of specification data;

FIG. 19 is a diagram showing a table stipulating a fundamental conversion rule.

DETAILED DESCRIPTION OF THE PREFERRED EMBODIMENTS

Figure 1:
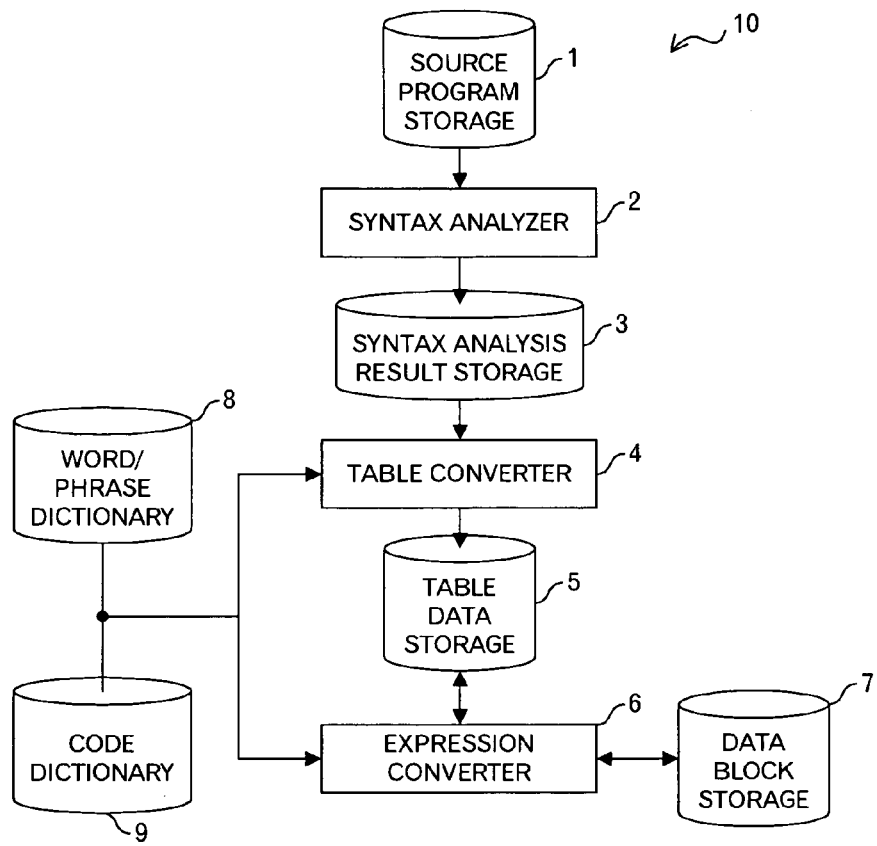
FIG. 1 is a functional block diagram of an embodiment of the present invention.
Figure 2:
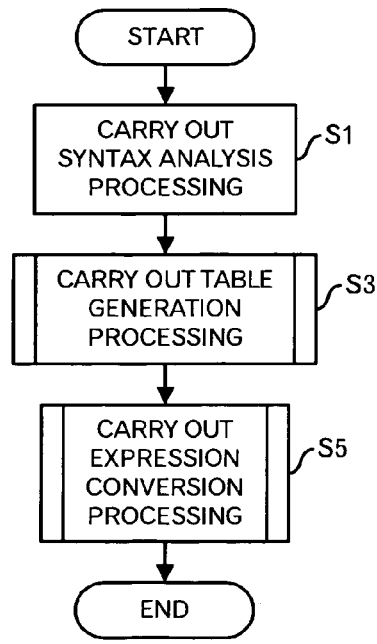
FIG. 2 is a diagram showing a processing flow of the main processing relating to the embodiment of the invention.
Figure 3:
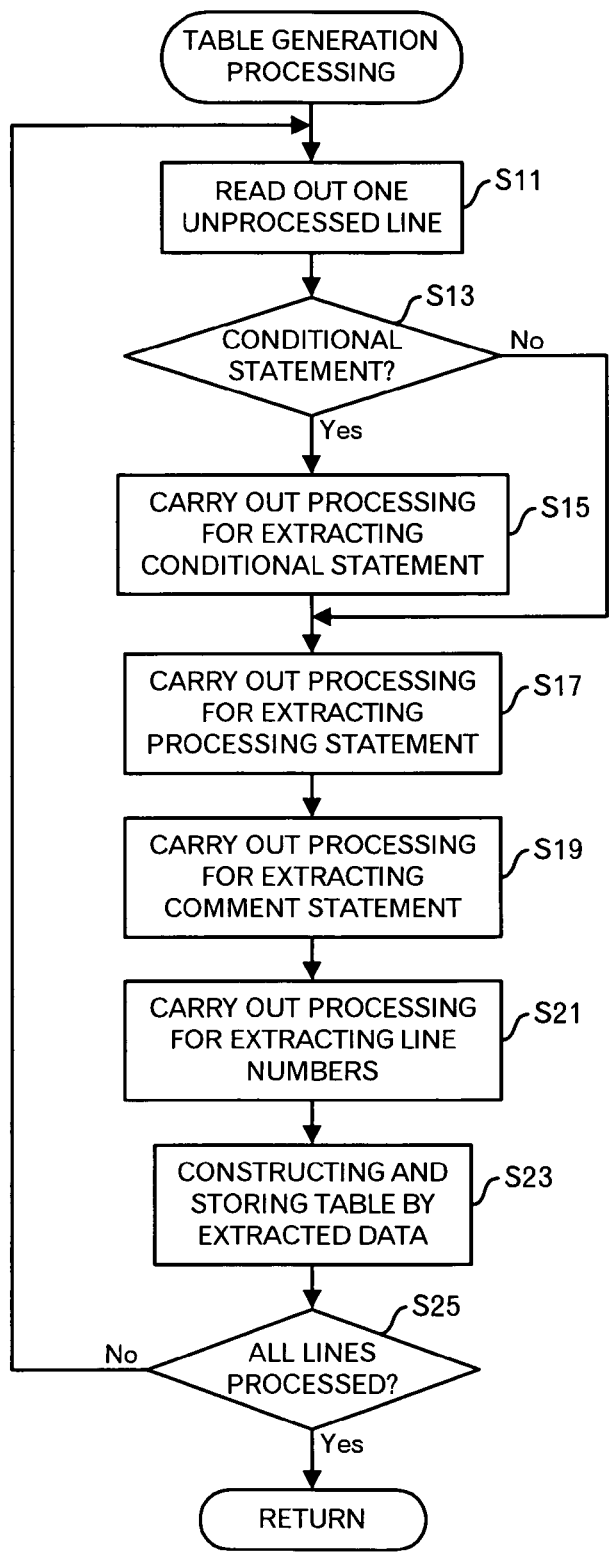
FIG. 3 is a diagram showing a processing flow of a table conversion processing.

FIG. 1 is a functional block diagram of a specification data generation apparatus according to one embodiment of the present invention. The specification data generation apparatus 10 has a source program storage 1 for storing a source program for which a specification is generated, a syntax analyzer 2 for carrying out a processing such as parsing of the source program, a syntax analysis result storage 3 for storing the results of the processing performed by the syntax analyzer 2, a table generator 4 for converting the data stored in the syntax analysis result storage 3 into data in tabular form, a word/phrase dictionary 8 in which the relation between each variable and a word or phrase indicating the meaning of the variable is registered, a code dictionary 9 in which the relation among each variable, its value, and a word or phrase indicating the meaning is registered, a table data storage 5 for storing the results of the processing performed by the table generator 4 and the like, an expression converter 6 for carrying out a processing for converting arithmetic operational expressions (described in detail later) using the data stored in the table data storage 5, and a data block storage 7 for storing data blocks that are intermediate data in the expression converter 6. The word/phrase dictionary 8 and code dictionary 9 are used by the table generator 4 and expression converter 6.

Next, the flow of the processing performed by the specification data generation apparatus 10 shown in FIG. 1 is described by referring to FIGS. 2-19. First, the syntax analyzer 2 reads out the source program to be processed from the source program storage 1, performs well-known syntactic analysis including parsing, and stores the results of the analysis in the syntax analysis result storage 3 (step S1). Then, the table generator 4 uses the data stored in the syntax analysis results storage 3 and refers to the word/phrase dictionary 8 and code dictionary 9 to carry out a table generation processing (step S3). This table generation processing will be described in detail later. The results of the table generation processing are stored in the table data storage 5. The expression converter 6 uses the data stored in the table data storage 5 and refers to the word/phrase dictionary 8 and code dictionary 9 to carry out an expression conversion processing (step S5). This expression conversion processing will also be described in detail. The results of the expression conversion processing are stored in the table data storage 5.

Next, the table generation processing is described by referring to FIGS. 3-6. First, the table generator 4 reads one unprocessed line from the syntax analysis result storage 3 (step S11). Then, it judges whether or not the read line is a conditional statement or not (step S13). Here, it is checked whether there is an "if" statement or the like. If it is judged that there is a conditional statement, it carries out a processing for extracting the conditional statement (step S15). Data concerning the extracted conditional statement is temporarily stored in a storage device such as a main memory. On the other hand, if it is judged that there is no conditional statement, the read line contains a certain processing statement. In addition, if the read line is a conditional statement, a processing statement associated with the conditional statement exists. Therefore, it carries out a processing for extracting the processing statement (step S17). Data concerning the extracted processed statement is temporarily stored in the storage device such as the main memory. If there is a comment statement associated with the conditional statement and processing statement extracted in steps S15 and S17, it carries out a processing for extracting the comment statement (step S19). Data concerning the extracted comment statement is temporarily stored in the storage device such as the main memory. Furthermore, it carries out a processing for extracting the line numbers of the extracted conditional statement, processing statement, and comment statement (step S21). The extracted line numbers are temporarily stored in the storage device such as the main memory.

Then, the table generator 4 generates a table from the extracted data stored, for example, in the main memory, and stores the table in the table data storage 5 (step S23). After that, it judges whether all lines have been processed (step S25). When there is any unprocessed line, the processing returns to the step S11. On the other hand, when all the lines have been processed, the processing returns to the original processing.

As an example, a case where the following Java source program (only a part of which is shown) is processed is described.

```
3 if (in_param.getRETURNCODE( ) == 0){
4           out_param.setNISSU(in_param.getNISSU( ));
5      }
```

In this case, the conditional statement is "in_param.getRETURN CODE( )=0". The processing statement is "out_param.setNISSU(in_param.getNISSU( ))". Although the numeral at the left end is a line number, it is not contained in the actual program but is shown here for reference. In such a case, data as shown in FIG. 4A is held, for example, at the stage of the step S23. In the example of FIG. 4A, the table includes a column of item numbers, a column of line numbers (line number of the processing statement and line number of the conditional statement associated with the processing statement), a column processing contents, a column of condition 1 (when plural conditions are associated, subsequent conditions will follow), and a column of remarks (comment statement). The processing statements, associated conditional statements and their line numbers are registered.

Incidentally, in the step S23, data shown in FIG. 4A may be further converted according to a conversion rule described in the end of the description of the present embodiment to store data as shown in FIG. 4B. That is, "out_param.setNISSU (in_param.get NISSU( ))" is converted into "out_param.NISSU=in_param.NISSU". "in_param.getRETURN CODE( )==0" is converted into "in_param.RETURNCODE=0". Furthermore, a conversion from the variable to the word or phrase may be carried out by referring to the word/phrase dictionary 8 and code dictionary 9. The processing for converting expressions as described below is mainly a processing for methods of the BigDecimal class. Therefore, simple conversions are performed for the processing statements and conditional statements, which have been clearly found to have no relationship to any method of the BigDecimal class in the step S23. For example, as shown in FIG. 4C, the variable is converted into a word or phrase indicating the meaning of the variable using the word/phrase dictionary 8 storing the data as shown in FIG. 5. That is, the word/phrase dictionary 8 stores a variable name, and a word or phrase data indicating its meaning. Accordingly, "in_param" is converted into "input area", "RETURNCODE" is converted into "return value", "out_param" is converted into "output area", and "NISSU" is converted into "No. of days". The code dictionary 9 may also be used. The code dictionary 9 holds data as shown in FIG. 6. That is, the code dictionary 9 includes a variable name, its value, and data indicating its meaning. Therefore, if a combination of the corresponding variable name and its value is identified, data indicating the meaning is also registered in the table.

Figure 7:
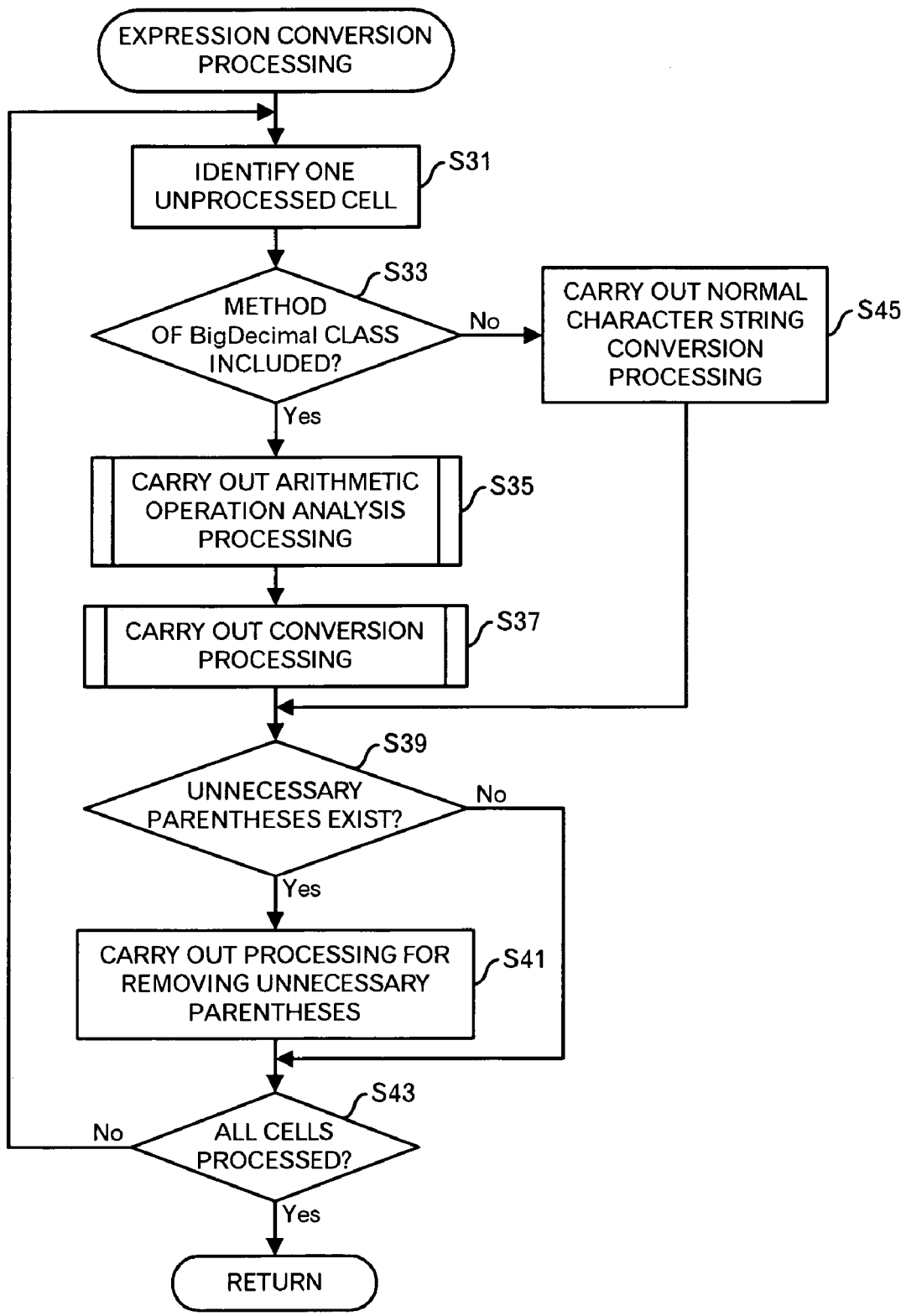
FIG. 7 is a diagram showing a processing flow of an expression conversion processing.
Figure 8:
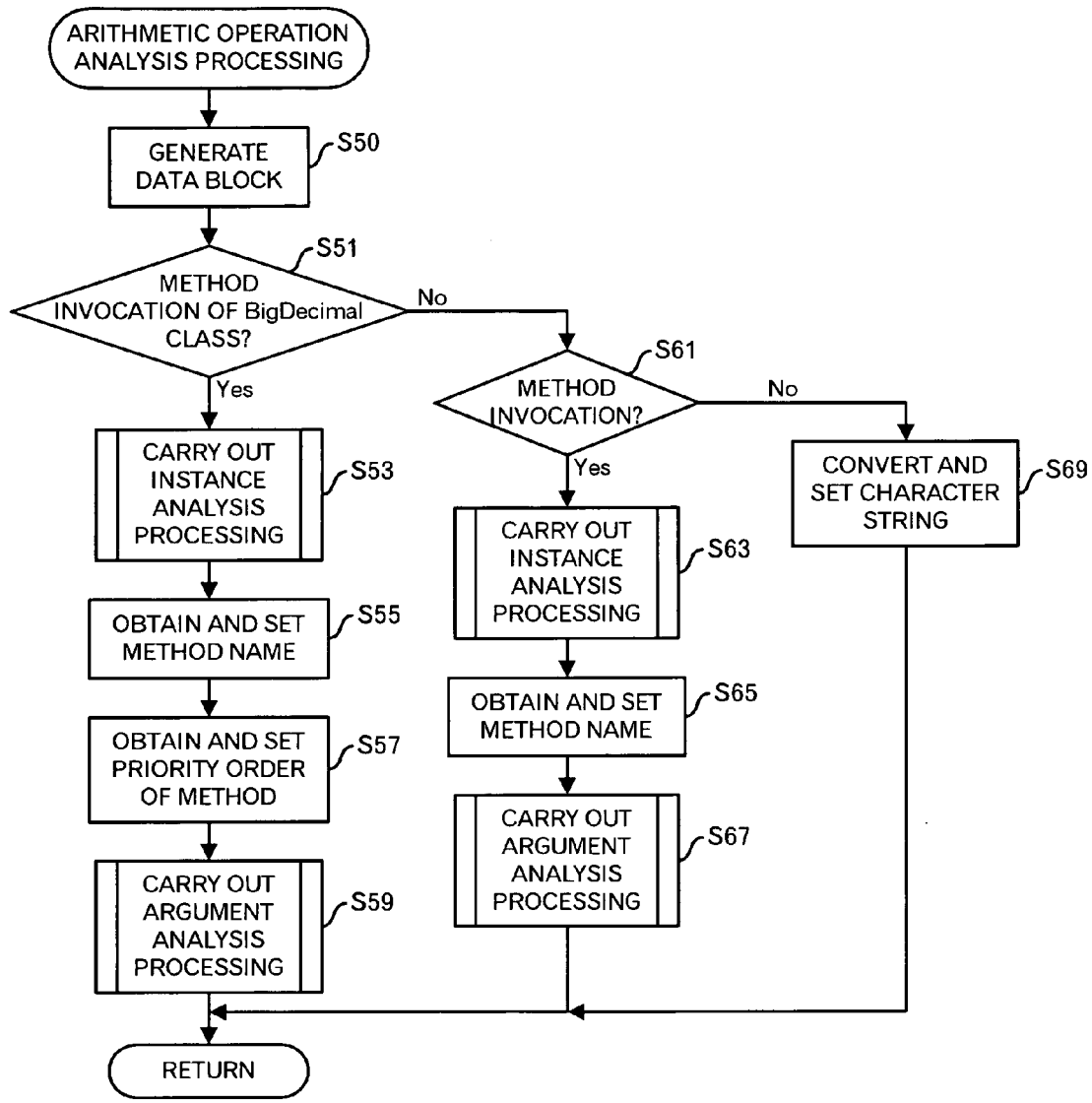
FIG. 8 is a diagram showing a processing flow of an arithmetic operation analyzing processing.
Figure 9:
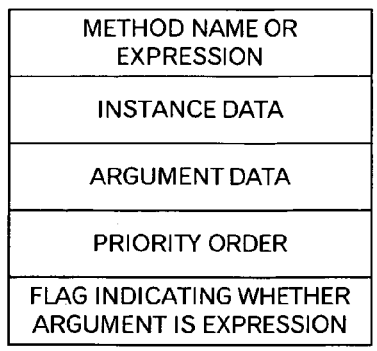
FIG. 9 is a diagram illustrating the structure of a data block.

The expression conversion processing is next described by referring to FIG. 7. First, the expression converter 6 identifies one of unprocessed cells in the column of the processing contents and the column of the condition in the table (step S31). Then, it judges whether a method of the BigDecimal class is stipulated for the statement contained in this cell (step S33). If it is judged that a method of the BigDecimal class is stipulated, it carries out an arithmetic operation analysis processing for the statement in the cell (step S35). Although this processing will be described later, it generates a group of data blocks for the statement contained in the cell and stores the group of data blocks in the data block storage 7. Then, it carries out a conversion processing using the data stored in the data block storage 7 (step S37). Although this processing will be described later, it stores an arithmetic operational expression using normal operators into the cell. Incidentally, at this time, it also carries out a replacement processing using the word/phrase dictionary 8 and code dictionary 9. On the other hand, if it is judged that any method of the BigDecimal class is not stipulated, it carries out a normal character string conversion processing according to a conversion rule described in the end of the description of the present embodiment, and stores the generated data in the cell (step S45).

After the step S37 or S45, it carries out a processing for checking whether there are unnecessary parentheses in the arithmetic operational expression in the cell (step S39). If it is judged that there are unnecessary parentheses in the arithmetic operational expression in the cell, it carries out a processing for removing the unnecessary parentheses (step S41). For example, in a case where only a variable or constant is present within the parentheses, the parentheses are unnecessary. Therefore, it removes them. For instance, in a case where an expression or subexpression "c.multiply(a).add (b)" is contained in the cell, a conversion resulting in "c*(a)+(b)" may be done by the conversion processing. In such a case, ( ) of (a) and ( ) of (b) are unnecessary. Therefore, they are deleted. Furthermore, where a subexpression "((a+b))*c" is obtained, ( ) on the outside of ((a+b)) are unnecessary and so they are removed. Data obtained after the removal is saved in the cells of the table. In this way, (1) parentheses surrounding only a variable or constant and (2) parentheses not surrounding a character string other than parentheses are unnecessary and so they are deleted. In a case where it is judged that there are no unnecessary parentheses, or after the step S41, it judges whether the processing has been carried out for all the cells of the table (step S43). If there exists any unprocessed cell, the processing returns to the step S31. On the other hand, if there exists no unprocessed cell, the processing returns to the original processing.

Next, the arithmetic operation analysis processing (step S35 in FIG. 7) is described by referring to FIGS. 8 to 13. First, the expression converter 6 generates a data block for methods of the BigDecimal class in the subexpression to be processed (step S50). In a case where this processing is called at the step S35 in FIG. 7, the entire expression is processed. However, because this processing is called recursively, the subexpression, which is a portion of the expression, is processed. It secures an area in the data block storage 7. The data block is a data area as shown, for example, in FIG. 9. That is, the data block contains an area for a method name (or expression), an area for instance data, an area for argument data, an area for priority order, and an area for a flag indicating whether the argument is an expression. The name of a called method or the like is stored in the area for the method name. In a case where the instance is not a method, the data name of the instance is stored in the area for the instance data. In a case where the instance is a method, a pointer (or the data block itself) to the data block for the method of the instance is stored. The data name is stored in the area for the argument data in a case where the argument is not an expression. In a case where the argument is an expression, the pointer to the data block for the argument (or the data block itself) is stored. The priority order of the operator corresponding to the method of the BigDecimal class is stored in the area for the priority order. With respect to a flag indicating whether the argument is an expression or not, if the argument of the method is an expression, "1", for example, is stored. If not, "0" is stored. In the present embodiment, in a case where the present arithmetic operation analysis processing is called in steps other than the step S35 of FIG. 7, it is assumed that the forefront address of the data block is registered in the area for the instance data or in the area for the argument data in accordance with the processing performed in the calling source.

In addition, a method invocation is composed of three parts: instance portion, method name, and argument. For example, in the case of a method invocation "data1.add (data2)", the instance portion is "data1". The method name is "add". The argument is "data2". In a case where method invocations take place consecutively (e.g., in the case of a method invocation "data1.add(data2).multiply(data4)"), the instance of the method "multiply" is "data1.add(data2)". The argument of the method "multiply" is "data4". The instance of the method "add" is "data1". The argument of the method "add" is "data2".

Then, it judges whether the subexpression to be processed is a method invocation of the BigDecimal class (step S51). Because it has been checked in the step S33 of FIG. 7 whether it is a method invocation of the BigDecimal class, a duplication occurs, if this processing is called at the step S35 of FIG. 7. However, because the present arithmetic operation analysis processing is called recursively, the present step is necessitated.

If it is judged that it is a method invocation of the BigDecimal class, it carries out an instance analysis processing (step S53). This processing is described later. The present arithmetic operation analysis processing is also called in the instance analysis processing. Then, it obtains the method name of the subexpression to be processed, and sets the method name in the area for the method name in the data block for this method (step S55). Moreover, it obtains the priority of the method, and sets the priority in the area for the priority order (step S57). The priority orders of methods are shown in FIG. 10. That is, the priority order has been determined in advance such that "pow>multiply" or "divide>add or subtract". This represents the priority orders in normal calculations. In addition, it carries out an argument analysis processing (step S59). This processing will be described later. In the argument analysis processing, the present arithmetic operation analysis processing is also called. Then, control returns to the original processing.

On the other hand, if it is judged at the step S51 that any method of the BigDecimal class is not called in the subexpression to be processed, it checks whether any class other than the BigDecimal class is called (step S61). If there is a method invocation of a class other than the BigDecimal class, it carried out the instance analysis processing (step S63), and obtains the method name, and sets the method name in the area for the method name in the data block for the method (step S65). Furthermore, it carries out the argument analysis processing for the method (step S67). The step S63 is the same processing as the step S53. The step S67 is the same processing as the step S59. Then, control returns to the original processing.

Moreover, if it is judged at the step S61 that it is not a method invocation, it carries out a normal character string conversion processing as described in the last part of the present embodiment, and registers the character string in the area for the method name in the data block of the subexpression to be processed (step S69). Then, control returns to the original processing.

Next, the instance analysis processing is described by referring to FIG. 11. The expression converter 6 makes a decision as to whether a method invocation is contained in the instance to be processed (step S71). If it is judged that no method invocation is contained in the instance to be processed, it obtains the instance name, and sets the instance name in the area for the instance data in the data block for the subexpression to be processed (step S73). Then, control returns to the original processing. On the other hand, if it is judged that a method invocation is contained, it carries out the arithmetic operation analysis processing shown in FIG. 8 for this method (step S75). Then, control returns to the original processing. As described above, in a case where a method invocation is present in the instance, a chain of data blocks is formed.

Next, the argument analysis processing is described by referring to FIG. 12. The expression converter 6 makes a decision as to whether the argument to be processed is an expression or not (step S81). The result of the decision is set in the data block as a flag indicating whether the argument is an expression or not. If it is judged that the argument to be processed is not an expression, it obtains the argument name, and sets the argument name in the area for the argument data in the data block for the subexpression to be processed (step S83). Then, control returns to the original processing. On the other hand, if it is judged that the argument is an expression, it carries out the arithmetic operation analysis processing of FIG. 8 (step S85). Then, control returns to the original processing. As described above, in a case where the argument is an expression, a chain of the data blocks is formed.

A specific example of the arithmetic operation analysis processing is now described. It is assumed that an arithmetic operational expression "data1.add(data2.method1( )).subtract(data3.data4).multiply(data5)" is to be processed.

Figure 13:
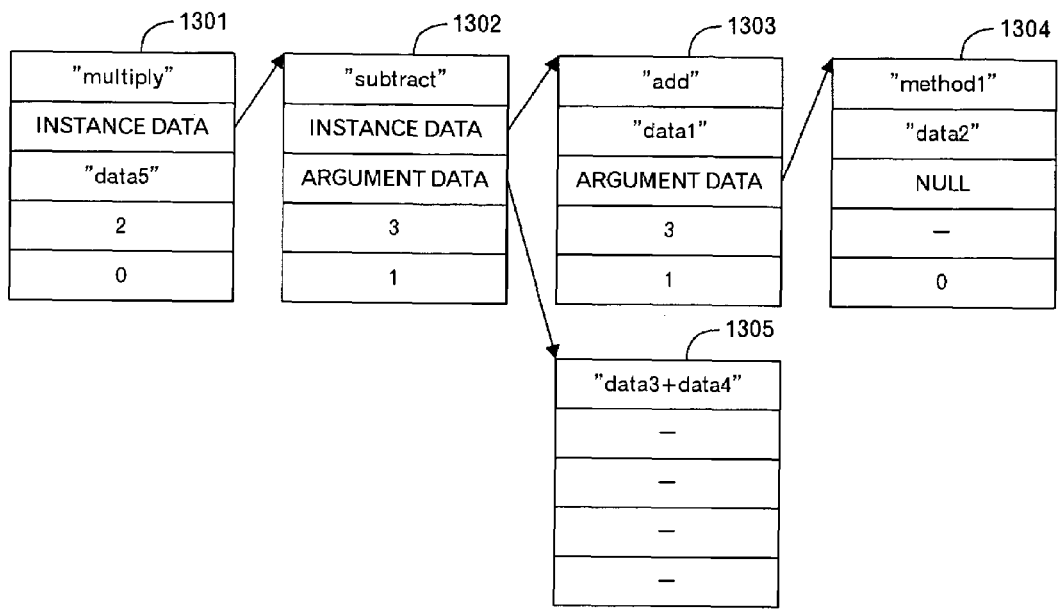
FIG. 13 is a diagram showing a specific example of the data block chain.
Figure 14:
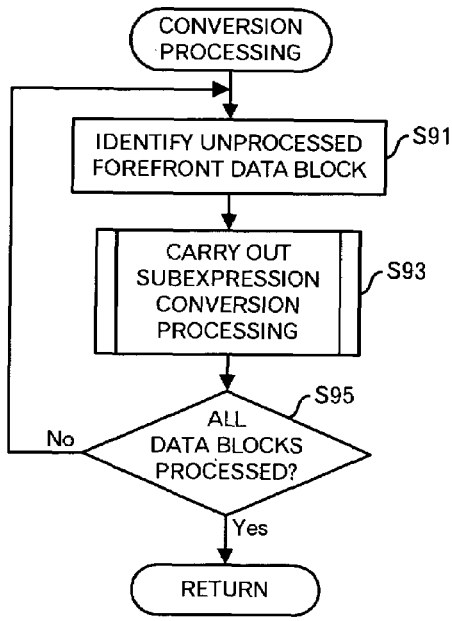
FIG. 14 is a diagram showing a processing flow of a conversion processing.

First, a data block for the method "multiply" is generated in the step S50. For example, a data block 1301 as shown in FIG. 13 is generated. Because it is confirmed that the method "multiply" is a method invocation of the BigDecimal class in the step S51, the instance analysis processing is carried out in the step S53. In the instance analysis processing, it is checked that the instance is a method invocation in the step S71. Because a method "subtract" exists, the arithmetic operation analysis processing for the method "subtract" is carried out in the step S75.

Then, a data block 1302 for the method "subtract" is generated in the step S50 (FIG. 13). A pointer to the data block 1302 is set in the area for the instance data in the data block 1301. Because it is checked that the method "subtract" is a method invocation of the BigDecimal class, the instance analysis processing is carried out in the step S53. In the instance analysis processing, it is checked that the instance is a method invocation in the step S71. Because there is a method "add", the arithmetic operation analysis processing is carried out for the method "add" in the step S75.

A data block 1303 (FIG. 13) for the method "add" is generated in the step S50. A pointer to the data block 1303 is set in the area for the instance data in the data block 1302. Because it is checked that the method "add" is a method invocation of the BigDecimal class, the instance analysis processing is carried out in the step S53. In the instance analysis processing, it is judged that the instance is not a method invocation in the step S71 and therefore, the instance name "data1" is obtained in the step S73 and stored in the area for the instance data in the data block 1303. Then, the method name "add" is obtained in the step S55 and stored in the area for the method name in the data block 1303. A method priority corresponding to the method "add" is obtained at the step S57 and priority "3" is set in the area for the priority order in the data block 1303 (see FIG. 10). Then, the argument analysis processing is carried out in the step S59. In the argument analysis processing, it is judged whether the argument of the method "add" is an expression or not in the step S81. Here, it is judged that it is an expression using a method "data2.method1( )", and the arithmetic operation analysis processing is carried out for the argument in the step S85. A flag indicating whether the argument of the data block 1303 is an expression or not is set to "1".

Then, a data block 1304 (FIG. 13) for the method "method1" is generated in the step S50. A pointer to the data block 1304 is set in the area for the argument data in the data block 1303. Because it is judged at the step S51 that the method "method1" is not a method invocation of the BigDecimal class and therefore, control goes to the step S61. A decision is made as to whether it is a method invocation. Because the method "method1" is a method invocation, the instance analysis processing is carried out at the step S63. In the instance analysis processing, a decision is made as to whether the instance is a method invocation in the step S71. Because it is "data2", it is determined that it is not a method invocation. In the step S73, instance name "data2" is obtained and set in the area for the instance data in the data block 1304. Then, method name "method1" is obtained in the step S65 and set in the area for the method name in the data block 1304. The argument analysis processing is carried out in the step S67. In the argument analysis processing, a decision is made as to whether the argument of the method "method1" is an expression in the step S81. Because the argument is empty in this example, no setting is made in the step S83. The argument analysis processing for the method "method1" is completed. A flag indicating whether the argument of the data block 1304 is an expression or not is set to "0".

Here, the argument analysis processing for the method "add" is completed. Also, the instance analysis processing for the method "subtract" is completed. That is, processings up to the step S53 for the method "subtract" are completed. The name of the method "subtract" is obtained in the step S55 and set in the area for the method name in the data block of the data block 1302. Furthermore, a method priority corresponding to the method "subtract" is obtained in the step S57, and priority "3" (see FIG. 10) is set in the area for the priority order in the data block 1302. Thereafter, the argument analysis processing for the method "subtract" is carried out in the step S59. In the argument analysis processing, a decision is made as to whether the argument of the method "subtract" is an expression or not in the step S81. Because the argument is "data3+data4" in this example, it is determined that the argument is an expression. The arithmetic operation analysis processing for this argument is carried out in the step S85. A flag indicating whether the argument of the data block 1302 is an expression or not is set to "1".

Then, a data block 1305 for the argument "data3+data4" is generated in the step S50. A pointer to the data block 1305 is set in the area for the argument data in the data block 1302. A decision made in the step S51 is that the argument "data3+data4" is not a method invocation of the BigDecimal class. It is determined in the step S61 that it is not a method. Accordingly, the processing for converting a character string is carried out for the argument in the step S69. The "data3+data4" is set in the area for the method name in the data block 1305.

In this way, the argument analysis processing for the method "subtract" is completed. Also, the instance analysis processing for the method "multiply" is completed. That is, the processing up to the step S53 for the method "multiply" is completed. The name of the method "multiply" is obtained in the step S55 and set in the area for the method name in the data block 1301. In the step S57, a method priority corresponding to the method "multiply" is obtained, and priority "2" (see FIG. 10) is set in the area for the priority order in the data block 1301. Then, the argument analysis processing is carried out for the method "multiply" in the step S59. In the argument analysis processing, a decision is made as to whether the argument of the method "multiply" is an expression or not in the step S81. Because the argument is "data5" in this example, it is determined that the argument is not an expression. In step S83, the argument is set in the area for the argument data in the data block 1301. A flag indicating whether the argument of the data block 1301 is an expression or not is set to "0".

By carrying out the processing described so far, a data structure including a chain of data blocks as shown in FIG. 13 is generated. The chain of the data blocks is made to correspond to a cell in the table in the table data storage 5.

Incidentally, the processing described in connection with FIGS. 8-13 is a processing only for one method in the cell of the table or for one term in a case where plural terms are present in one cell. In some cases, the aforementioned processing must be carried out plural times for each one cell.

Next, the conversion processing (the step S37 in FIG. 7) is described by referring to FIGS. 14-17. First, the expression converter 6 identifies an unprocessed forefront data block in the data block storage 7 (step S91). Then, it carries out a subexpression conversion processing for a group of data blocks chained from the forefront data block (step S93). This processing will be described later. After that, it judges whether all the data blocks have been processed (step S95). If there is any unprocessed data block, control returns to the step S91. If the processing for all the data blocks is completed, control goes back to the original processing.

Figure 15:
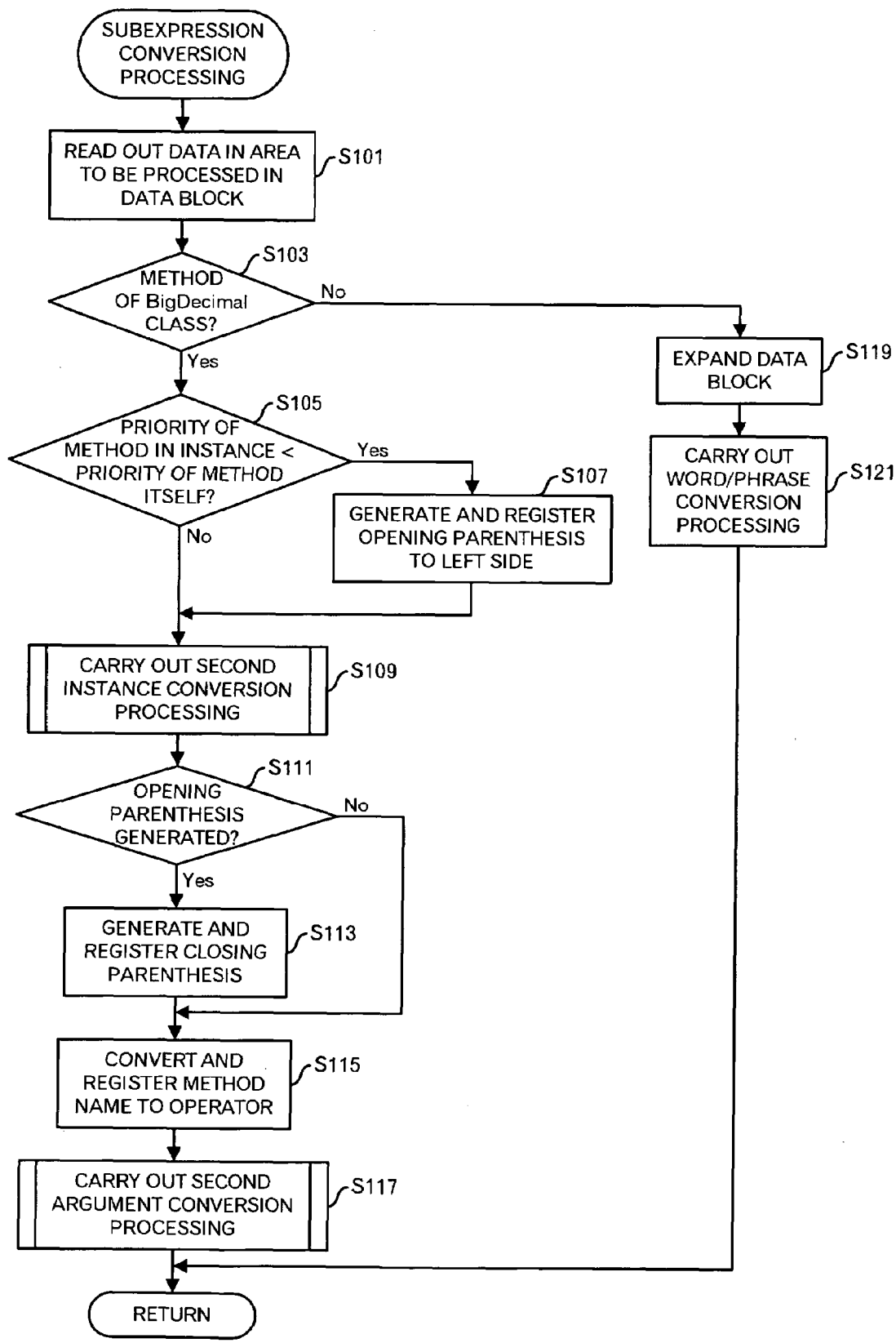
FIG. 15 is a diagram showing a processing flow of subexpression conversion processing.

The subexpression conversion processing is described by referring to FIG. 15. First, the expression converter 6 reads out data (data in the area for the method name or in the area for the argument data) in the area of the data block that is to be processed (step S101). Then, it judges whether the read method name is a method of the BigDecimal class (step S103). If it is judged that the read method name is a method of the BigDecimal class, it judges whether the method priority for the instance of the method is lower than the priority of the method itself (step S105). For example, in the arithmetic operational expression that is a basis of the data blocks shown in FIG. 13, the method "multiply" is shown next to the method "subtract" when viewed from the left. However, the actual calculation is the multiplication of the argument of the method "multiply" and the whole instance of the method "multiply", which includes the arithmetic operation by the method "subtract". Accordingly, if the expression is converted to a normal arithmetic operational expression, the whole instance must be parenthesized according to the priorities of operators. However, in the case of a subtraction or summation that is not higher in priority than a multiplication (i.e., "subtract" or "add" is used instead of "multiply"), no parentheses are necessary. Accordingly, the value of the area for the priority order for the forefront data block 1301 and the value of the area for the priority order for the data block 1302, which is referenced from the area for the instance data are compared.

In a case where the priority of the method in the instance of this method is lower than that of the method itself, it generates an opening parenthesis to the left side and registers the open parenthesis (step S107). For example, "(" is stored into the cell to be processed in the table data storage 5. Then, control proceeds to step S109. On the other hand, in a case where the priority of the method in the instance of this method is higher than that of the method itself, it carries out a second instance conversion processing (step S109). The second instance conversion processing will be described later. Then, it judges whether the opening parenthesis has been generated (step S111). In a case where control has passed through the step S107, the opening parenthesis has been generated. Therefore, it generates a closing parenthesis to the right side and registers the closing parenthesis (step S113). For example, ")" is stored into the cell to be processed in the table data storage 5. In a case where it is judged that the opening parenthesis has not been generated or after the steps S113, it converts the method name of the method to be processed into an operator, and registers the operator (step S115). If the method is "multiply", it is converted into "*". If the method name is "add", it is converted into "+". If the method name is "subtract", it is converted into "−". If the method name is "divide", it is converted into "/". If the method name is "pow", it is converted into "". The operator is registered in the cell to be processed in the table data storage 5. Then, it carries out a second argument conversion processing (step S117**). This second argument conversion processing will be described later. Then, control returns to the original processing.

On the other hand, if it is judges at the step S103 that the read method name or the like does not indicate a method of the BigDecimal class, it is considered that a normal method or expression is stored in the data block being processed. Therefore, it expands the data block (step S119). For example, if it is a normal expression, it is left intact. If it is a normal method, it reads out data from the area for the instance data and expands the read data into a form such as "instance.method". Then, it carries out a word/phrase conversion processing using the word/phrase dictionary 8 and code dictionary 9, for instance, and registers the result (step S121). If there is no registration in the word/phrase dictionary 8 or code dictionary 9, the data is registered intact into the cell to be processing in the table data storage 5. If the instance is "in_param", the method name is "NISSU", and there is a registration in the word/phrase dictionary 8 as shown in FIG. 5, a conversion to "input area. No. of days" is made, and the result is registered into the cell to be processed in the table data storage 5. Then, control returns to the original processing.

Figure 16:
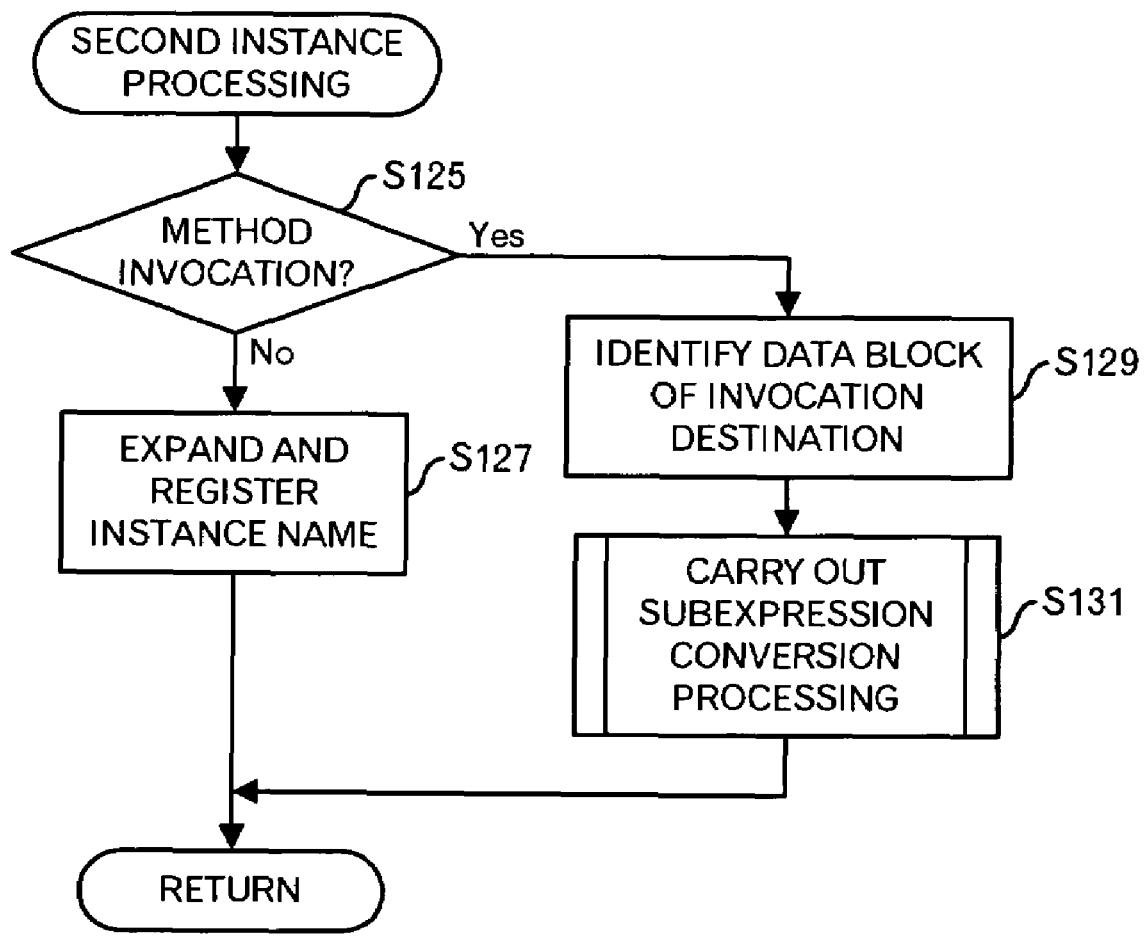
FIG. 16 is a diagram showing a processing flow of a second instance conversion processing.

Next, the second instance conversion processing at the step S109 is described by referring to FIG. 16. First, the expression converter 6 judges whether the instance of the method to be processed is a method invocation (step S125). That is, it checks whether or not a pointer to the data block to be referenced is registered in the area for the instance data in the data block relating to the present processing. If the instance of the method to be processed is a method invocation, it identifies the data block at the invocation destination from the pointer (step S129), and carries out the subexpression conversion processing in FIG. 15 (step S131). Then, control returns to the original processing. On the other hand, in a case where the instance of the method to be processed is not a method invocation, it expands the instance name stored in the area for the instance data in the data block relating to this processing, and registers the expanded instance name in the cell to be processed in the table data storage 5 (step S127). Here, it converts a character string indicating the instance name into a word or phrase indicating the meaning by referring to the word/phrase dictionary 8, for example, converts the value of the variable into a word or phrase indicating the meaning by referring to the code dictionary 9, and registers the results into the cell to be processed in the table data storage 5. In a case where there is no registration in the word/phrase dictionary 8 and code dictionary 9, it registers the instance name or the value of the variable intact. Then, control returns to the original processing. As described above, in a case where a method is stipulated in the instance, data blocks are chained. Therefore, the processing is carried out along the chain.

Figure 17:
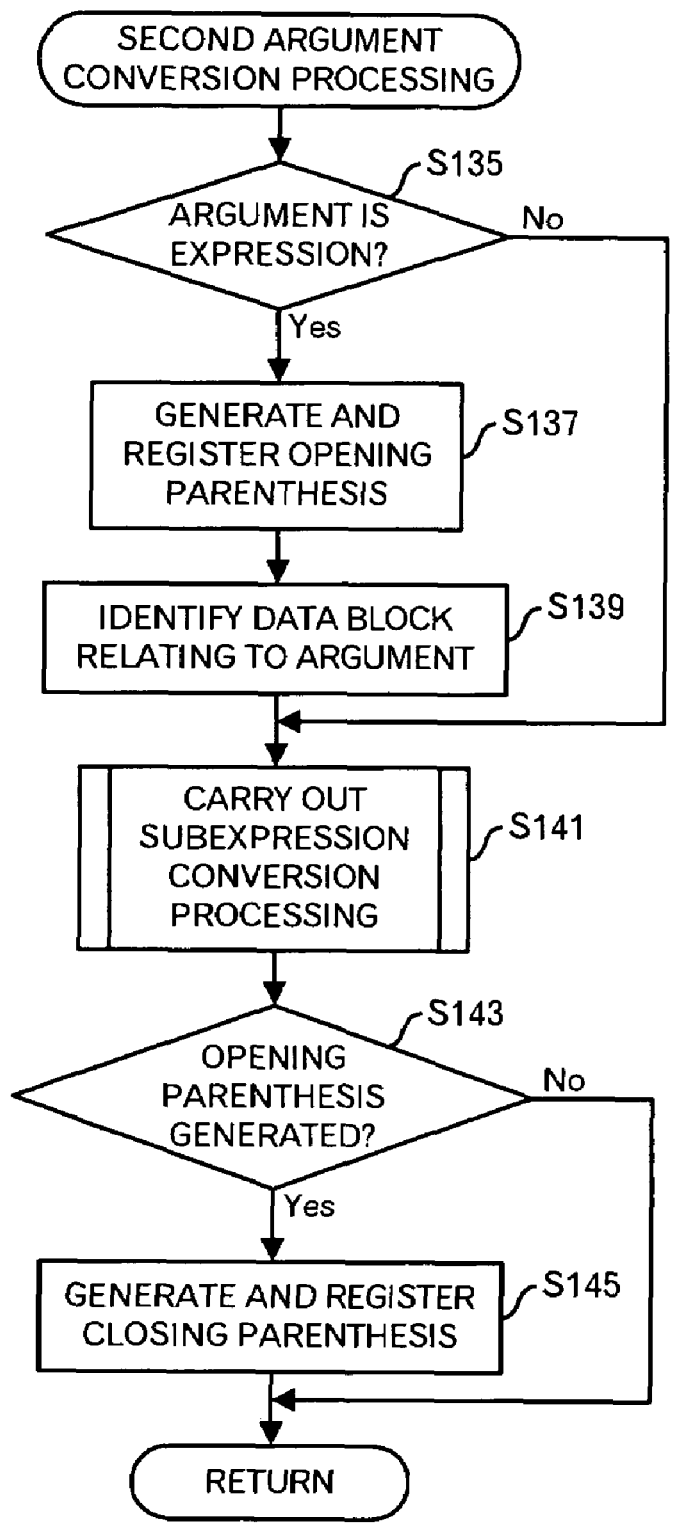
FIG. 17 is a diagram showing a processing flow of the second instance converting processing.

Next, the second argument conversion processing (step S117) is described by referring to FIG. 17. First, the expression converter 6 checks whether the argument to be processed is an expression (step S135). This can be easily judged according to the state of the flag indicating whether the argument of the data block is an expression or not. If the block is an expression, it generates an opening parenthesis to the left side, and registers the opening parenthesis in the cell to be processed in the table data storage 5 (step S137). Then, it identifies the data block relating to the argument by referring to the area for the argument data in the data block of the method (step S139).

If it is judged at the step S135 that the argument is not an expression, or after the step S139, it carries out the subexpression conversion processing for the argument (step S141). In particular, if the decision made in step S135 is affirmative (YES), the processing is performed for the data block identified at the step S139. If the decision made in the step S135 is negative (NO), the processing is performed for the data block of the original method. Then, it judges whether the opening parenthesis has been generated (step S143). That is, a decision is made as to whether control has passed through the step S137. In a case where the opening parenthesis has been generated, it generates the corresponding closing parenthesis, and registers the closing parenthesis in the cell to be processed in the table data storage 5 (step S145). Then, control returns to the original processing. On the other hand, in a case where the opening parenthesis has not been generated, control returns to the original processing.

The data block as shown in FIG. 13 is processed by performing the aforementioned processing to obtain a normal arithmetic operational expression that is easily readable for the reviewer, and by further converting the expression into words or phrases indicating the meaning of the variable to present them to the reviewer in tabular form.

With respect to the processing in FIGS. 14-17, a case where a data block as shown in FIG. 13 is processed is described in detail. First, the expression converter 6 reads out the method name "multiply" registered in the area for the method name in the data block 1301 in the step S101. In the step S103, it checks whether the method is a method of the BigDecimal class. Because the method "multiply" is a method of the BigDecimal class, it compares the priority registered in the area for the priority order in the data block 1301 for the method "multiply" with the priority registered in the area for the priority order in the data block 1302, the latter priority being obtained by tracing from the pointer set in the area for the instance data in the data block 1301. Then, it judges whether the priority of the method of the instance of the method "multiply" is lower than that of the method "multiply" itself. In this example, the priority of the method "subtract" of the instance of the method "multiply" is "3". The priority of the method "multiply" itself is "2". Therefore, the condition is satisfied. Accordingly, it generates the opening parenthesis in the step S107, resulting in "(" at this stage. Then, it carries out the second instance conversion processing in the step S109. In the second instance conversion processing, it judges whether the instance of the method "multiply" is a method invocation in the step S125. Because the method name "subtract" is registered in the area for the instance data in the data block 1302, the method name being obtained by tracing from the pointer set in the area for the instance data in the data block 1301, it is determined that the instance is a method invocation. Then, it identifies the data block 1302 of the invocation destination in the step S129. After that, it carries out the subexpression conversion processing in the step S131.

In the step S101 of the subexpression conversion processing, the expression converter 6 reads out the method name "subtract" registered in the area for the method name in the data block 1302. In the step S103, it checks whether the method name indicates a method of the BigDecimal class. Because the method "subtract" is a method of the BigDecimal class, it compares the priority registered in the area for the priority order in the data block 1302 for the method "subtract" with the priority registered in the area for the priority order in the data block 1303, the latter priority being obtained by tracing from the pointer set in the area for the instance data in the data block 1302. Then, it judges whether the priority of the method of the instance of the method "subtract" is lower than that of the method "subtract" itself. In this example, the priority of the method "add" of the instance of the method "subtract" is "3". The priority of the method "subtract" itself is "3". Therefore, the condition is not satisfied. Accordingly, it carries out the second instance conversion processing in the step S109. In the second instance conversion processing, it judges whether the instance of the method "subtract" is a method invocation in the step S125. Because the method name "add" is registered in the area for the method name in the data block 1303, which is obtained by tracing from the pointer set in the area for the instance data in the data block 1302, it is determined that the instance is a method invocation. Then, it identifies the data block 1303 of the invocation destination in the step S129. After that, it carries out the subexpression conversion processing in the step S131.

In the step S101 of the subexpression conversion processing, the expression converter 6 reads out the method name "add" registered in the area for the method name in the data block 1303. Then, it checks whether the method is a method of the BigDecimal class in the step S103. Because the method "add" is a method of the BigDecimal class, it compares the priority registered in the area for the priority order in the data block 1303 for the method "add" with the priority of the instance set in the area for the instance data in the data block 1303 in the step S105. Because the instance "data1" is registered in the area for the instance data in the data block 1303, no priority is set. Accordingly, the condition is not satisfied. Consequently, it carries out the second instance conversion processing in the step S109. In the second instance conversion processing, it judges whether the instance of the method "add" is a method invocation in the step S125. As described previously, "data1" is registered in the area for the instance data in the data block 1303. Therefore, it is determined that there is no method invocation. Then, the instance name "data1" from the area for the instance data in the data block 1303 is read out and expanded, resulting in "(data1". Because the second instance conversion processing for the method "add" is completed, it judges whether the opening parenthesis has been generated in the processing for the method "add" at the step S111. Because the opening parenthesis is not generated here, it expands an operator corresponding to the method name "add", resulting in "(data1+". Then, it carries out the second argument conversion processing in the step S117.

In the second argument conversion processing, the expression converter 6 judges whether the argument of the data block 1303 is an expression, according to the state of the flag indicating whether the argument is an expression or not. Because "1" indicating that it is an expression is registered in this example, it generates the opening parenthesis in the step S137, resulting in "(data1+(". Next, it identifies the data block 1304 for the argument from the pointer in the area for the argument data in the data block 1303 (step S139). Then, it carries out the subexpression conversion processing at the step S141.

In the subexpression conversion processing, the expression converter 6 reads out a method name "method1" from the area for the method name in the data block 1304 in the step S101. It is determined in the step S103 that "method1" is not a method of the BigDecimal class. Then, in the step S119, it expands the data block 1304, resulting in "(data1+(data2.method1". As a result, the subexpression conversion processing for the data block 1304 is completed. Then, control returns to the second argument conversion processing for the argument of the data block 1303. In the step S143, it judges whether the opening parenthesis has been generated. Because the opening parenthesis was generated in the step S137, it generates a closing parenthesis in the step S145, resulting in "(data1+(data2.method1)". Thus, the second argument conversion processing for the argument of the data block 1303 is completed, and the subexpression conversion processing for the data block 1303 is also completed. Then, the second instance conversion processing for the instance of the data block 1302 is completed, and control returns to the subexpression conversion processing for the data block 1302.

As a result, the expression converter 6 judges whether the opening parenthesis was generated in the step S111. However, because the opening parenthesis has not been generated for the data block 1302, control goes to the step S115. In the step S115, it expands an operator corresponding to the method name "subtract", resulting "(data1+(data2.method1)–" at this stage. Then, it carries out the second argument conversion processing in the step S117.

In the second argument conversion processing, the expression converter 6 judges whether the argument is an expression, according to the state of the flag indicating whether the argument of the data block 1302 is an expression or not in step S135. Because the flag is "1" in the data block 1302, the argument is an expression. Therefore, it generates an opening parenthesis, resulting in "(data1+(data2.method1)–(". Also, it identifies the data block relating to the argument from the pointer registered in the area for the argument data in the data block 1302 (step S139). In this example, the data block 1305 is identified. In the step S141, it carries out the subexpression conversion processing for the argument "data3+data4".

In the subexpression conversion processing, the expression converter 6 reads out the method name "data3+data4" from the area for the method name in the data block 1305 in the step S101. In the step S103, it judges whether "data3+data4" is a method of the BigDecimal class. Because the "data3+data4" is not a method of the BigDecimal class, it expands the data block in the step S119, resulting in "(data1+(data2.method1)–(data3+data4". In this way, the subexpression conversion processing for the data block 1305 is completed, and control returns to the second argument conversion processing for the data block 1302. Then, it judges whether the opening parenthesis has been expanded in the step S143. Because control has passed through the step S137, the opening parenthesis has been generated, it generates the closing parenthesis in the step S145, resulting in "(data1+(data2.method1)–(data3+data4)". With this step, the second argument conversion processing for the data block 1302 is completed. At the same time, the subexpression conversion processing for the data block 1302 is also completed. In addition, the second instance conversion processing for the data block 1301 is completed.

Accordingly, control returns to the subexpression conversion processing for the data block 1301, and the expression converter 6 judges whether the opening parenthesis has been generated in the step S111. Because control has passed through the step S107, the opening parenthesis has been generated. Therefore, it generates the closing parenthesis in the step S113. Furthermore, it converts the method name into a corresponding operator. At this stage, "(data1+(data2.method1)–(data3+data4)*" is obtained. Then, it carries out the second argument conversion processing for the data block 1301 in the step S117.

In the second argument conversion processing, the expression converter 6 judges whether the argument of the data block 1301 is an expression, according to the state of the flag indicating whether the argument is an expression or not in the step S135. Because the flag is set to "0" in the data block 1301, the argument is not an expression. Therefore, it carries out the subexpression conversion processing for "data5" registered in the area for the argument data in the data block 1301 in the step S141.

In the subexpression conversion processing, the expression converter 6 reads out the data "data5" registered in the area for the argument data in the data block 1301 in the step S101, and judges whether the data is a method of the BigDecimal class in the step S103. Because the "data5" is not a method, it expands the argument data in the data block 1301 intact in the step S119, resulting in "(data1+(data2.method1)–(data3+data4)*data5".

In this way, the methods are converted into data in a form that can be easily reviewed by the reviewer. Incidentally, in the above embodiment, conversions using the word/phrase dictionary 8 are not performed for data1, data2, method1, data3, data4, and data5. However, if they are registered in the word/phrase dictionary 8, the conversions for them are carried out. With respect to "data2.method1", because extra parentheses are attached, they are removed in unnecessary parenthesis removing processing.

In a case where the following source program exists, for example, data stored in the table data storage 5 takes a form as shown in FIG. 18.

[Example of Source Program]

```
class sample {
    void calc(denpyo in_param){
        if (in_param.getRETURNCODE( ) == 0) {
            out_param.setNISSU(in_param.getNISSU( ));
        } else {
            if (in_param.getRETURNCODE( ) == 1) {
                out_param.setGANKIN(BigDecimal.valueOf(out_param.
getGANKIN( ).get( )+(1+200)).divide(BigDecimal.valueOf(out_param.
getRITANI( ).get( )),0,BigDecimal.ROUND_DOWN).
```

-continued

```
multiply(BigDecimal.valueOf(out_param.getRITANI( ).get( ))));
                if (out_param.getHASUKUBUN( ).equals("2")) {
                    out_param.setRISOKU(BigDecimal.valueOf(out_param.get
WK_GANKIN( ).get( )).multiply(BigDecimal.valueOf(out_param.
getNISSU( ).get( ))).multiply(BigDecimal.valueOf(out_param.
getRATE( ).get( ))).divide(BigDecimal.valueOf(365).multiply(BizMath.
pow(BigDecimal.value Of(10),7,10)),10,BigDecimal.ROUND_DOWN).
add(new BigDecimal("0.999")));
                } else {
                    out_param.setWK_RISOKUA(BigDecimal.
valueOf(out_param.getWK_GANKIN( ).get( )).multiply(BigDecimal.
valueOf(out_param.getNISSU( ).get( ))).multiply(BigDecimal.
valueOf(out_param.getRATE( ).get( ))).divide(BigDecimal.valueOf(365).
multiply(BizMath.pow(BigDecimal.valueOf(10),7,1)),1,BigDecimal.
ROUND_DOWN));
                }
            } else {
                out_param.setERRORNO(2);
                return;
            }
        }
        out_param.setERRORNO(0);
    }
}
```

Project name, work space, and file name listed in a higher position within FIG. 18 are data items extracted from the environment within the specification data generation apparatus 10. Because they are not main portions of the present embodiment, their description is omitted herein. The method name corresponds to the data in the second line of the source program. The third and following lines are summarized in the table of FIG. 18. The first line is the same as in FIG. 4C. The fundamental data stored are identical. However, because conditions are set at plural stages, they are classified into each column such as condition 1, condition 2, or condition 3. In a case where more conditions are set, the number of columns is increased. In the column of condition 3, which has the item number 3, "fraction treatment category. round-up" is registered. The data is provided by the code dictionary 9, and indicates the variable value "2" of "output area. fraction treatment category".

Next, the conversion rule in the character string conversion whose detail explanation was omitted in the above description is described.

(1) Basic Conversion Pattern

The basic conversion pattern is indicated in FIG. 19.

(2) Expansion of a Conversion Method to the BigDecimal Type

In order to carry out the arithmetic operation of BigDecimal, it is necessary to convert a data class variable and work variable into a variable of BigDecimal type. However, because it is unnecessary in the specification data, following conversion is carried out.

BigDecimal.valueOf(getter of data item)=>data item

A specific example is as follows:

BigDecimal.valueOf(wk_x16.get WK_ZOUHENGK( ).get( ))

=>wk_x16. WK_ZOUHENGK (3) Method "Divide of BigDecimal Class

In the above description, the methods "subtract", "add" and "multiply" are indicated as examples. The method "divide" is converted as follows:

BigDecimal.valueOf(data_item_1).divide(BigDecimal.valueOf(data_item_2), length under the decimal point, ROUNDED destination)=>data_item_1/data_item_2

A specific example is as follows:

BigDecimal.valueOf(wk_x16.getWK_ZOUHENGK( ).get( )).divide(BigDecimal.valueOf(kwlarkgv.getKGVKWCYUJBZK( ).get( ), 10, BigDecimal.ROUND_DOWN)
=>wk_x16.WK_ZOUHENGK/KWLARKGV.KGVKWCYUJBZK (4) Method pow of BizMath Class The following conversion is carries out.

BizMath.pow(multiplicand, exponent)
=>multiplicand**exponent

BizMath.pow(BigDecimal.valueOf(multiplicand), exponent, reference length under the decimal point)
=>multiplicand**exponent A specific example is as follows:

BizMath.pow(BigDecimal.valueOf
(wk_x16.getWK_ZOUHENGK( ).get( ), 3, 5)
=>wk_x16.WK_ZOUHENGK**3

(5) Method pow of Math Class

The following conversion is carried out.

Math.pow(double type multiplicand, double type exponent)
=>multiplicand**exponent A specific example is as follows:

Math.pow((double) (wk_x16.getWK_ZOUHENGK( ).get( ), 3.5)
=>wk_x16.WK_ZOUHENGK**3.5

(6) Method for Special Processing

The following conversion is carried out.

setscale (length under the decimal point, BigDecimal.ROUND_DOWN) (never set at the end of the setter
method)=>" " (delete)

A specific example is as follows:

x.setCC(BigDecimal.valueOf(x.getCC( ).get( )).multiply
(BigDecimal.valueOf(x.getBB( ).get( )).setScale(10, BigDecimal.ROUND_DOWN).divide(BigDecimal.valueOf
(x.getAA( ).get( )), 8, BigDecimal.ROUND_DOWN))
=>CC=CC*BB/AA In addition, the following conversion is also carried out.

setter method(calculation result. setscale (length under the decimal point, BigDecimal.ROUND_HALF_UP))
=>add "ROUNDED" to the end of the execution statement after the conversion A specific example is as follows:

x.setCC(BigDecimal.valueOf(x.getCC( ).get( )).divide(BigDecimal.valueOf(x.getAA( ).get( )), 8, BigDecimal.ROUND_DOWN).setScale(8, BigDecimal.ROUND_HALF_UP))
=>CC=CC/AA ROUNDED (7) Others For example, "set" is replaced with "=" as described below.

wk_x16.setWK_RISOKUG(wk_x16.getWK_RISOKUG( ).checkDigit(BigDecimal.valueOf
(wk_x16.getWK_KEKKA1( ).get( )).multiply(BigDecimal.valueOf(wk_x16.getWK_KEKKA2( ).get( ))).multiply(BigDecimal.valueOf(wk_x16.getWK_TSUKISU( ).get( )).divide(BizMath.pow(BigDecimal.valueOf(10),7,0),0,
BigDecimal.ROUND_DOWN)))=> wk_x16.WK_RISOKUG=wk_x16.WK_RISOKUG.checkDigit(wk_x16.WK_KEKKA1*wk_x16.WK_KEKKA2*wk_x16.WK_TSUKISU/(10**7))

As described above, although one embodiment of the invention is described, this invention is not limited to this. That is, in an actual program, the functional blocks in FIG. 1 does not always correspond to program modules. In addition, because it is possible to obtain the same result, there are some steps, which can be executed in parallel or whose execution orders can be exchanged.

Figure 20:
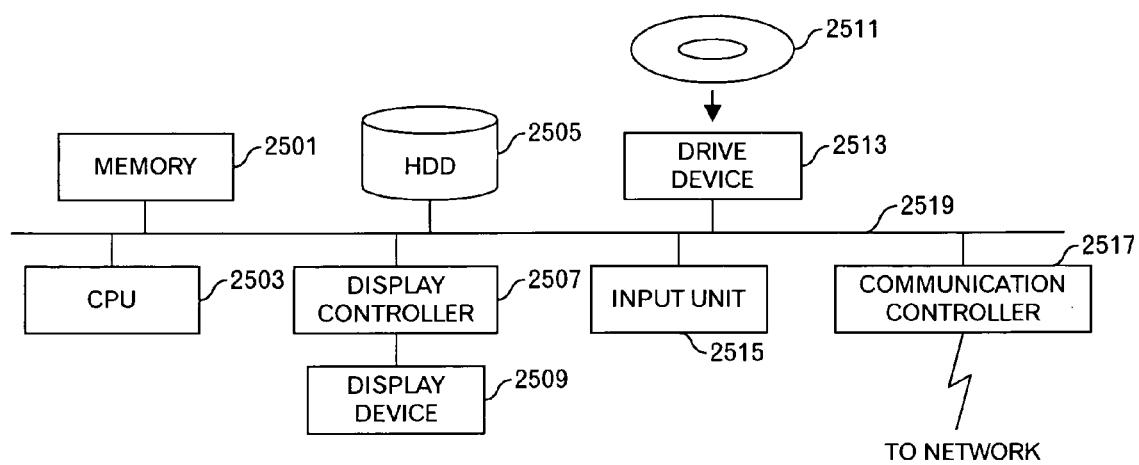
FIG. 20 is a functional diagram of a computer.

The specification data generation apparatus 10 is a computer, and the computer has a configuration as shown in FIG. 20. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519. An operating system (OS) and an application program for carrying out the foregoing processing in respective embodiments, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operation. Besides, intermediate processing data is stored in the memory 2501, and if necessary, it is stored in the HDD 2505. In this embodiment of this invention, the application program to realize the aforementioned functions is stored in the removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in details are realized.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A computer-implemented method for generating specification data from a source program in which arithmetic operations are described in a method format, comprising:

identifying a priority conforming to a predetermined arithmetic rule for an arithmetic operational method included in an arithmetic operational statement that is included in a source program and defines an arithmetic operation, and registering said arithmetic operational method and said priority into a storage device;

if it is judged based on data stored in said storage device that a plurality of arithmetic operational methods are included in an arithmetic operational statement, and an arithmetic operational method with first priority is defined as an instance of an arithmetic operational method with second priority, generating specification data and storing said specification data into a specification data storage by converting said arithmetic operational method with first priority and an instance and an argument of said arithmetic operational method with first priority into a first subexpression using an arithmetic operational sign in accordance with a predetermined rule, adding parentheses representing that the arithmetic operation are carried out with priority, to said first subexpression, converting said arithmetic operational method with second priority and an argument of said arithmetic operational method with second priority into a second subexpression using an arithmetic operational sign in accordance with said predetermined rule, and linking said second subexpression with said first subexpression, and wherein said second priority is higher than said first priority.

2. The computer-implemented method as set forth in claim 1, wherein said identifying comprises generating a data block holding a priority for an arithmetic operational method, data concerning an instance of said arithmetic operational method, and data concerning an argument of said arithmetic operational method, and storing said data block into said storage device.

3. The computer-implemented method as set forth in claim 1, wherein said generating comprises referring to a first dictionary storing a variable name and a corresponding word or phrase indicating a meaning of said variable name, and replacing a variable included in said first and second subexpressions with a corresponding word or phrase.

4. The computer-implemented method as set forth in claim 1, further comprising:
analyzing said source program to identify a processing statement and a condition associated with said processing statement, and storing said processing statement in said specification data storage so as to correspond to said condition, and
wherein said identifying is carried out for said processing statement that is an arithmetic operational statement and said condition.

5. The computer-implemented method as set forth in claim 1, wherein said generating comprises:
checking whether there are parentheses surrounding only one term in an arithmetic operational expression or there are parentheses surrounding only parenthesized characters; and
removing said parentheses if there are parentheses surrounding only one term in said arithmetic operational expression or there are parentheses surrounding only parenthesized characters.

6. The computer-implemented method as set forth in claim 1, wherein said generating comprises referring to a second dictionary storing a word or phrase indicating a meaning of a value of a variable to extract a word or phrase corresponding to a specific value of a specific variable, and storing the extracted word or phrase into said specification data storage.

7. The computer-implemented method as set forth in claim 2, wherein said data concerning said argument includes data representing whether or not said argument is an expression, and said generating comprises:
referring to said data block to judge whether or an argument of an arithmetic operational method is an expression; and
if it is judged that said argument is an expression, converting said expression of said argument into a third subexpression using an arithmetic operational sign according to said predetermined rule, and adding parentheses to said third subexpression.

8. A computer readable storage medium having a program embodied on the medium, for generating specification data from a source program in which arithmetic operations are described in a method format, said program comprising:
identifying a priority conforming to a predetermined arithmetic rule for an arithmetic operational method included in an arithmetic operational statement that is included in a source program and defines an arithmetic operation, and registering said arithmetic operational method and said priority into a storage device;
if it is judged based on data stored in said storage device that a plurality of arithmetic operational methods are included in an arithmetic operational statement, and an arithmetic operational method with first priority is defined as an instance of an arithmetic operational method with second priority, generating specification data and storing said specification data into a specification data storage by converting said arithmetic operational method with first priority and an instance and an argument of said arithmetic operational method with first priority into a first subexpression using an arithmetic operational sign in accordance with a predetermined rule, adding parentheses representing that the arithmetic operation are carried out with priority, to said first subexpression, converting said arithmetic operational method with second priority and an argument of said arithmetic operational method with second priority into a second subexpression using an arithmetic operational sign in accordance with said predetermined rule, and linking said second subexpression with said first subexpression, and wherein said second priority is higher than said first priority.

9. An apparatus for generating specification data from a source program in which arithmetic operations are described in a method format, comprising:
a storage device;
a specification data storage device;
a unit that identifies a priority conforming to a predetermined arithmetic rule for an arithmetic operational method included in an arithmetic operational statement that is included in a source program and defines an arithmetic operation, and registers said arithmetic operational method and said priority into said storage device;
a unit that generates said specification data and stores said specification data into said specification data storage, if it is judged based on data stored in said storage device that a plurality of arithmetic operational methods are included in an arithmetic operational statement, and an arithmetic operational method with first priority is defined as an instance of an arithmetic operational method with second priority, by converting said arithmetic operational method with first priority and an instance and an argument of said arithmetic operational method with first priority into a first subexpression using an arithmetic operational sign in accordance with a predetermined rule, adding parentheses representing that the arithmetic operation are carried out with priority, to said first subexpression, converting said arithmetic operational method with second priority and an argument of said arithmetic operational method with second priority into a second subexpression using an arithmetic operational sign in accordance with said predetermined rule, and linking said second subexpression with said first subexpression, and wherein said second priority is higher than said first priority.

* * * * *